US011636123B2

(12) United States Patent
Lecue et al.

(10) Patent No.: US 11,636,123 B2
(45) Date of Patent: Apr. 25, 2023

(54) DENSITY-BASED COMPUTATION FOR INFORMATION DISCOVERY IN KNOWLEDGE GRAPHS

(71) Applicant: Accenture Global Solutions Limited, Dublin (IE)

(72) Inventors: Freddy Lecue, Dublin (IE); Chahrazed Bouhini, Dublin (IE); Jeremiah Hayes, Dublin (IE); Mykhaylo Zayats, Dublin (IE); Nicholas McCarthy, Dublin (IE); Qurrat Ul Ain, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 689 days.

(21) Appl. No.: 16/223,602

(22) Filed: Dec. 18, 2018

(65) Prior Publication Data
US 2020/0110746 A1    Apr. 9, 2020

Related U.S. Application Data

(60) Provisional application No. 62/741,928, filed on Oct. 5, 2018.

(51) Int. Cl.
*G06F 16/2458* (2019.01)
*G06F 16/23* (2019.01)
*G06F 16/901* (2019.01)
*G06F 17/11* (2006.01)

(52) U.S. Cl.
CPC .......... *G06F 16/2465* (2019.01); *G06F 16/23* (2019.01); *G06F 16/9024* (2019.01); *G06F 17/11* (2013.01)

(58) Field of Classification Search
CPC ... G06F 16/2465; G06F 16/23; G06F 16/9024
USPC ........................................................ 707/609
See application file for complete search history.

(56) References Cited

U.S. PATENT DOCUMENTS

| | | | | |
|---|---|---|---|---|
| 6,067,093 | A * | 5/2000 | Grau | G06T 11/206 |
| | | | | 345/440 |
| 6,285,992 | B1 * | 9/2001 | Kwasny | G06K 9/6267 |
| | | | | 706/20 |
| 7,496,597 | B2 * | 2/2009 | Rising, III | G06K 9/6252 |
| 7,925,599 | B2 * | 4/2011 | Koren | G06K 9/6215 |
| | | | | 706/12 |
| 9,075,824 | B2 * | 7/2015 | Gordo | G06F 16/583 |
| 9,275,148 | B1 * | 3/2016 | Elassaad | G06F 16/951 |
| 9,483,547 | B1 * | 11/2016 | Feller | G06F 16/287 |
| 9,489,377 | B1 * | 11/2016 | Feller | G06F 40/30 |
| 9,632,654 | B1 * | 4/2017 | Elassaad | G06F 3/0481 |
| 9,852,231 | B1 * | 12/2017 | Ravi | G06N 20/00 |
| 9,990,687 | B1 * | 6/2018 | Kaufhold | G06N 3/0454 |

(Continued)

*Primary Examiner* — Tony Mahmoudi
*Assistant Examiner* — Michael Le
(74) *Attorney, Agent, or Firm* — Crowell & Moring LLP (57) ABSTRACT

Knowledge graph systems are disclosed for enhancing a knowledge graph by generating a new node. The knowledge graph system converts a knowledge graph into an embedding space, and selects a region of interest from within the embedding space. The knowledge graph system further identifies, from the region of interest, one or more gap regions, and calculates a center for each gap region. A node is generated for each gap region, and the information represented by the node is added to the original knowledge graph to generate an updated knowledge graph.

18 Claims, 8 Drawing Sheets

(56) References Cited

U.S. PATENT DOCUMENTS

| | | | |
|---|---|---|---|
| 10,095,775 B1* | 10/2018 | Bull | G06F 16/374 |
| 10,157,226 B1* | 12/2018 | Costabello | G06F 16/313 |
| 10,198,491 B1* | 2/2019 | Semturs | G06F 16/951 |
| 10,430,464 B1* | 10/2019 | Ravi | G06F 16/9024 |
| 2004/0093328 A1* | 5/2004 | Damle | G06F 16/345 |
| 2005/0131924 A1* | 6/2005 | Jones | G06F 16/283 |
| 2009/0012842 A1* | 1/2009 | Srinivasan | G06F 40/30 705/12 |
| 2009/0138415 A1* | 5/2009 | Lancaster | G06N 5/04 706/11 |
| 2010/0121792 A1* | 5/2010 | Yang | G06F 16/9024 706/12 |
| 2010/0185672 A1* | 7/2010 | Rising, III | G06K 9/6251 707/780 |
| 2010/0211927 A1* | 8/2010 | Cai | G06F 40/117 717/104 |
| 2010/0332475 A1* | 12/2010 | Birdwell | G06F 16/283 707/737 |
| 2011/0040711 A1* | 2/2011 | Perronnin | G06N 20/10 706/12 |
| 2011/0191374 A1* | 8/2011 | Bengio | G06F 16/50 707/780 |
| 2011/0302118 A1* | 12/2011 | Melvin | G06N 20/00 706/21 |
| 2012/0158633 A1* | 6/2012 | Eder | G16H 15/00 706/46 |
| 2013/0054603 A1* | 2/2013 | Birdwell | G06K 9/6253 707/738 |
| 2013/0149677 A1* | 6/2013 | Slone | G09B 19/0092 434/127 |
| 2013/0297617 A1* | 11/2013 | Roy | G06N 5/02 707/748 |
| 2013/0325784 A1* | 12/2013 | Morara | G06Q 50/26 706/46 |
| 2014/0075004 A1* | 3/2014 | Van Dusen | H04L 41/04 709/223 |
| 2014/0156733 A1* | 6/2014 | Goranson | G06F 16/957 709/203 |
| 2014/0282219 A1* | 9/2014 | Haddock | G06F 16/36 715/781 |
| 2015/0095303 A1* | 4/2015 | Sonmez | G06N 5/003 707/707 |
| 2015/0161748 A1* | 6/2015 | Ratakonda | G06Q 10/063 705/15 |
| 2015/0169758 A1* | 6/2015 | Assom | G06F 16/36 707/603 |
| 2015/0248478 A1* | 9/2015 | Skupin | G06F 16/367 707/609 |
| 2016/0042298 A1* | 2/2016 | Liang | G06F 16/353 706/12 |
| 2016/0042299 A1* | 2/2016 | Liang | G06F 16/24578 706/12 |
| 2016/0196587 A1* | 7/2016 | Eder | G06Q 30/0271 705/14.49 |
| 2016/0239746 A1* | 8/2016 | Yu | G06N 7/005 |
| 2017/0011091 A1* | 1/2017 | Chehreghani | G06F 16/22 |
| 2017/0076206 A1* | 3/2017 | Lastras-Montano | G06F 16/9024 |
| 2017/0139902 A1* | 5/2017 | Byron | G06Q 10/087 |
| 2017/0161279 A1* | 6/2017 | Franceschini | G06N 5/02 |
| 2017/0177681 A1* | 6/2017 | Potiagalov | G06F 16/26 |
| 2017/0177744 A1* | 6/2017 | Potiagalov | G06F 16/904 |
| 2017/0228641 A1* | 8/2017 | Sohn | G06N 3/0454 |
| 2017/0270245 A1* | 9/2017 | van Rooyen | G16B 30/00 |
| 2017/0286397 A1* | 10/2017 | Gonzalez | G06F 40/35 |
| 2017/0324759 A1* | 11/2017 | Puri | H04L 41/0631 |
| 2017/0357896 A1* | 12/2017 | Tsatsin | G06N 3/084 |
| 2018/0033017 A1* | 2/2018 | Gopalakrishnan Iyer | G06N 5/003 |
| 2018/0039696 A1* | 2/2018 | Zhai | G06F 16/35 |
| 2018/0075359 A1* | 3/2018 | Brennan | G06F 16/9024 |
| 2018/0082197 A1* | 3/2018 | Aravamudan | G06N 5/04 |
| 2018/0129941 A1* | 5/2018 | Gustafson | G06N 20/00 |
| 2018/0129959 A1* | 5/2018 | Gustafson | G06N 20/00 |
| 2018/0137424 A1* | 5/2018 | Gabaldon Royval | G06N 5/022 |
| 2018/0144252 A1* | 5/2018 | Minervini | G06F 40/247 |
| 2018/0189634 A1* | 7/2018 | Abdelaziz | G06N 5/022 |
| 2018/0197104 A1* | 7/2018 | Marin | G06N 5/022 |
| 2018/0210913 A1* | 7/2018 | Beller | G06F 16/9024 |
| 2018/0254101 A1* | 9/2018 | Gilmore | G16H 15/00 |
| 2018/0260750 A1* | 9/2018 | Varshney | G06F 16/24578 |
| 2018/0336183 A1* | 11/2018 | Lee | G06N 5/022 |
| 2018/0351971 A1* | 12/2018 | Chen | H04L 41/024 |
| 2018/0365614 A1* | 12/2018 | Palmer | G06Q 10/0633 |
| 2019/0005115 A1* | 1/2019 | Warner | G06F 17/18 |
| 2019/0005374 A1* | 1/2019 | Shankar | G06N 3/084 |
| 2019/0012405 A1* | 1/2019 | Contractor | G06F 16/248 |
| 2019/0034780 A1* | 1/2019 | Marin | G06N 3/006 |
| 2019/0042988 A1* | 2/2019 | Brown | G06N 5/022 |
| 2019/0080245 A1* | 3/2019 | Hickman | G06K 9/6296 |
| 2019/0122111 A1* | 4/2019 | Min | G06N 3/0481 |
| 2019/0155926 A1* | 5/2019 | Scheideler | G06F 16/215 |
| 2019/0155945 A1* | 5/2019 | Zhelezniak | G06F 16/3347 |
| 2019/0196436 A1* | 6/2019 | Nagarajan | G06K 7/0004 |
| 2019/0197396 A1* | 6/2019 | Rajkumar | G06N 3/08 |
| 2019/0197398 A1* | 6/2019 | Jamali | G06N 3/08 |
| 2019/0205964 A1* | 7/2019 | Onoro Rubio | G06N 5/022 |
| 2019/0303535 A1* | 10/2019 | Fokoue-Nkoutche | G06N 7/005 |
| 2019/0392330 A1* | 12/2019 | Martineau | G06N 5/022 |
| 2020/0057946 A1* | 2/2020 | Singaraju | G06N 5/025 |
| 2020/0081445 A1* | 3/2020 | Stetson | G06K 9/6218 |
| 2020/0242484 A1* | 7/2020 | Lecue | G06N 5/022 |
| 2020/0311616 A1* | 10/2020 | Rajkumar | B25J 9/163 |

* cited by examiner

DENSITY-BASED COMPUTATION FOR INFORMATION DISCOVERY IN KNOWLEDGE GRAPHS

CROSS-REFERENCE TO RELATED APPLICATION(S)

This application claims benefit to U.S. Provisional Patent Application No. 62/741,928, filed on Oct. 5, 2018, the entirety of which is incorporated by reference herein.

TECHNICAL FIELD

This disclosure relates to complex computer system architectures for implementing enhancements to an existing knowledge graph, including the application of stand alone or combined approaches for knowledge graph generation.

BACKGROUND

Traditional approaches for searching enterprise data typically entail using string matching mechanisms. However, such previous approaches are limited in their ability to provide queried data. Moreover, most of the data stored within an enterprise is dark, meaning is it not easily searchable or available for analytics. Accordingly, conventional knowledge query systems return results that do not provide a complete picture of knowledge and data available in the enterprise, requiring extra consumption of computing resources as knowledge queries are repeated and return inaccurate or incomplete results.

Data may be stored in different data stores depending on factors including data structure, volatility, volume, or other measurable attribute. These data stores may be designed, managed, and operated by different units within an enterprise organization. It follows that such data stores in practice behave as data silos which are disparate, isolated, and make data less accessible across the units. More transparent and open data storage solutions are desired by enterprise organizations to more efficiently and effectively share and access its information amongst their different units.

DETAILED DESCRIPTION

To take advantage of the benefits offered by big data technologies, enterprise systems have access to large, and rapidly growing, volumes of information, both proprietary and public. Existing analytical applications and data warehousing systems have not been able to fully utilize this profound access to information. Often times information is simply aggregated into large data lakes or data warehouses without the inclusion of an added layer of relationship data connecting the information. Such aggregation of large amounts of data without contextual or relational information are data dumps that are not particularly useful. Information stored in data lakes and data warehouses are likely to be stored in their original format, thus expending large amounts of computing resources to extract, transform, and load (ETL) the information into a searchable data set to respond to a data query.

To address these technical problems, a knowledge graph is disclosed that offers an innovative data structure for presenting relevant information in response to a data query, as well as relationship information between the relevant information. The knowledge graph includes a knowledge base of relevant information that is structured in a graph presentation that captures entities (i.e., nodes), relationships (i.e., edges), and attributes (i.e., node properties or edge properties) with semantic meaning. This graph data structure model offered by the knowledge graph provides the semantic meaning of the included data, by modeling data with an ontology or taxonomy. Accordingly, technical improvements are realized when a computing device structures information into knowledge graphs and runs search queries on the knowledge graphs, which specifically result in the retrieval of more relevant and accurate information, in a shorter amount of time.

The present disclosure further utilizes the enhanced level of structured data offered by knowledge graphs, to identify new and useful combinations of information extracted from the existing information from the knowledge graphs. To accomplish these results, the present disclosure describes embedding techniques for translating the knowledge graph to a plot of nodes within an embedding space, selecting an area of interest within the embedding space, identifying empty areas within the area of interest in the embedding space, identifying a center node from the empty areas, and reconstructing relationships (i.e., edges or connections) of new nodes that represent the center nodes. The new node are then included in the knowledge graph creating updated knowledge graph. Those nodes are depictions of the center nodes from the embedding space, and represent new combinations, and/or recommendations, of information included in the original knowledge graph.

The features described herein are applicable to knowledge graphs of data representing various fields and may represent information within a specific field such as, for example, food recipe data or pharmaceutical formulation data. In the example of the knowledge graph representing food recipe data, the new nodes in the updated knowledge graph may include a recipe for an existing dish, that has been updated with new added ingredients or compounds, updated with new ingredients to replace existing ingredients or compounds, or ingredients or compounds to be removed from the previously existing recipe. Similarly, in the example of the knowledge graph representing pharmaceutical formulations, the new nodes in the reconstructed knowledge graph may include a drug formulation that has been updated with new added ingredients or compounds, updated with new ingredients to replace existing ingredients or compounds, or ingredients or compounds to be removed from the previously existing drug formulation.

According to the exemplary embodiments described herein, the knowledge graphs are described to represent food recipes, where the system attempts discovering new recipes, and the system determines possible set of ingredients that constitutes newly discovered recipes based on the techniques described herein. For example, the enhancement techniques include identifying new recipe, and then updating the recipe with ingredients known to go well with the identified new recipe. The new recipes may be predicted by identifying "gaps" between known recipes, and trying to fill in these gaps with new recipes. These "gaps" may represent areas where information is determined to be missing. So by looking at a space consisting of known recipes, the enhancement solutions are able to build upon the known recipes (i.e., enhance the old recipes) by presenting new combinations of ingredients previously not thought of that are predicted to go well together. Accordingly, new recipe recommendations may be generated automatically. Although the example of recipe formulation is discussed, the knowledge graph enhancement techniques described herein are applicable to knowledge graphs build on data from other fields as well.

Figure 1:
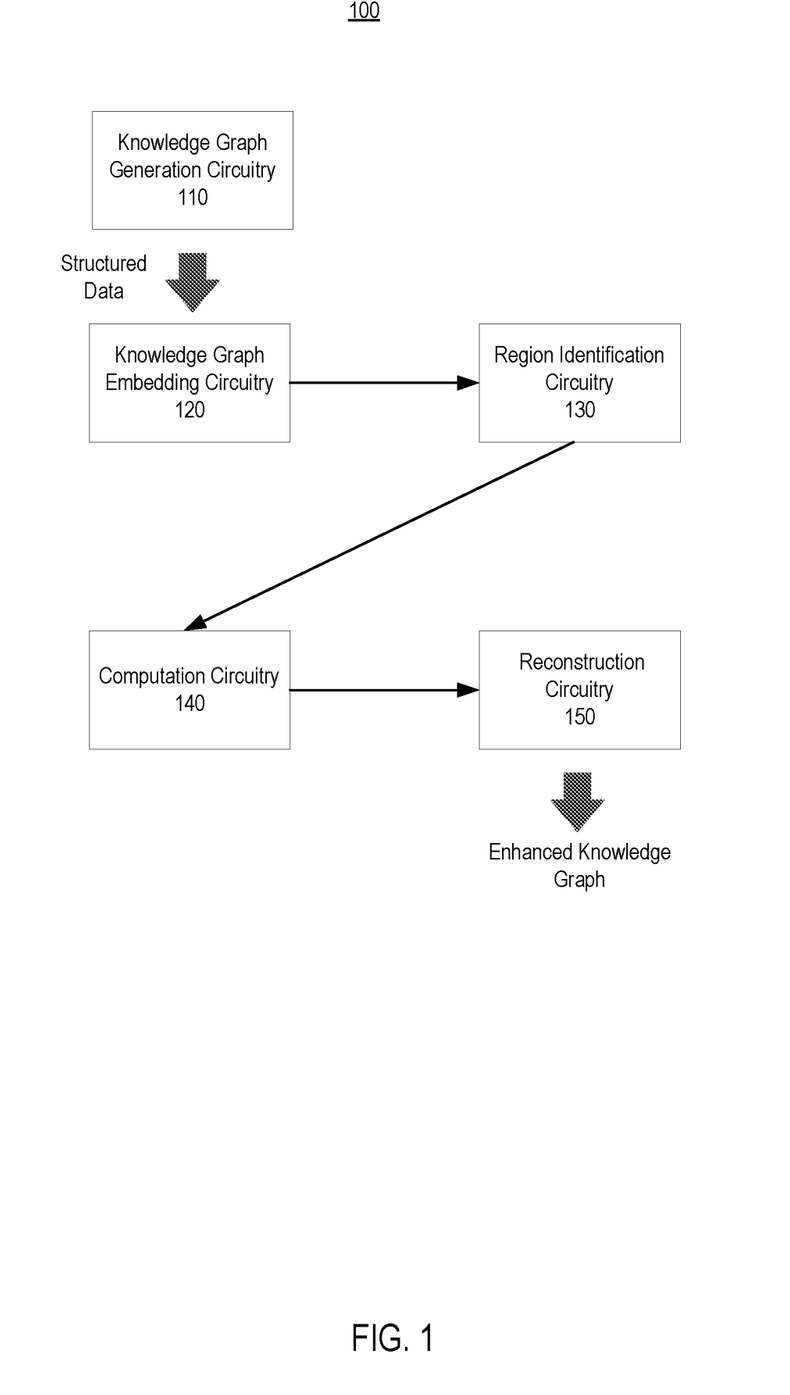
FIG. 1 shows an exemplary block diagram representation of a knowledge graph enhancement system for implementing a knowledge graph enhancement process.

FIG. 1 illustrates an exemplary block diagram of a knowledge graph enhancement (KGE) system 100 for enhancing an existing knowledge graph by including new nodes of information. The circuitry described herein may include the hardware, software, middleware, and/or other components for implementing the corresponding features.

Figure 3:
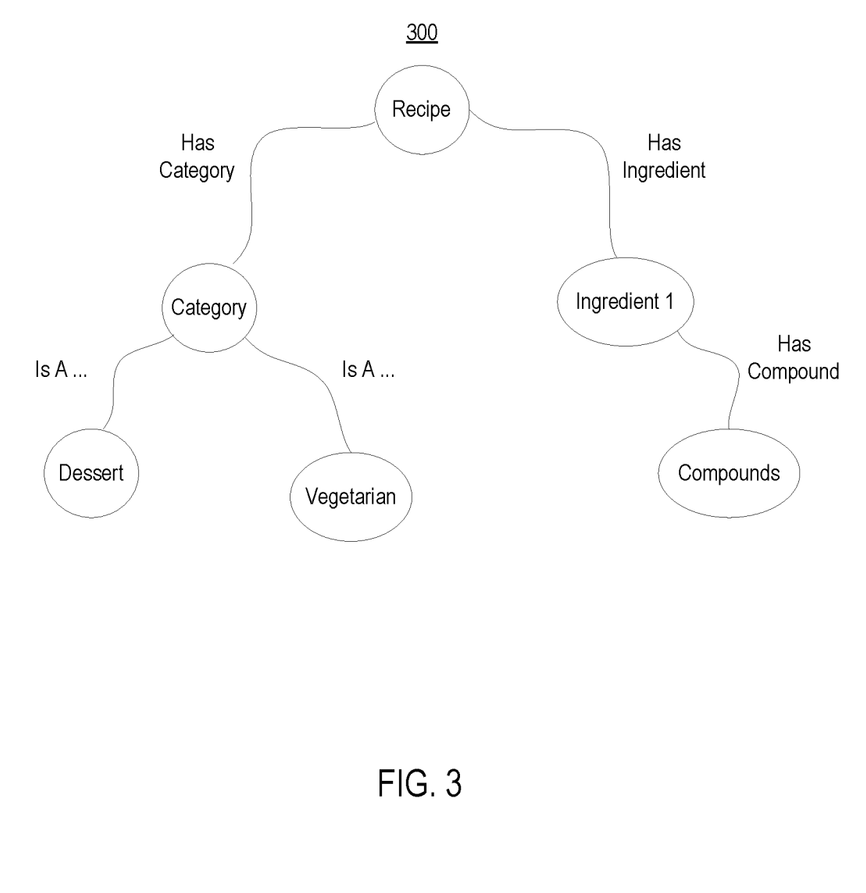
FIG. 3 shows an exemplary knowledge graph.

Initially, a knowledge graph generation circuitry 110 constructs a knowledge graph from received information. Constructing a knowledge graph may include at least two steps. First, a graph schema definition is obtained for the knowledge graph and refinement is applied as the knowledge graph is being generated. This defines the types of vertices and edges that are generated into the knowledge graph. Second, the knowledge graph is hydrated with information by ingesting knowledge from one or more data sources, and applying one or more knowledge extraction techniques (e.g., natural language processing (NLP), schema mapping, computer visions, or the like), to create the vertices and edges in the knowledge graph. Each data source may create its own data processing pipeline for extracting data to include into the knowledge graph being constructed. The resulting knowledge graph provides a specific format of structured data where each node includes information, and each connecting edge represents a relationship between nodes. For example, FIG. 3 shows an exemplary knowledge graph 300 including information pertaining to known recipes, where each node includes information and each edge represents a relationship between the information included in the nodes.

To provide additional context of the technical field and the knowledge graph system disclosed herein, the contents of U.S. patent application Ser. No. 15/150,030, filed on May 9, 2016 (published as U.S. Patent Application Publication No. US 2017/0324759 on Nov. 9, 2017), are hereby incorporated by reference herein.

Figure 4:
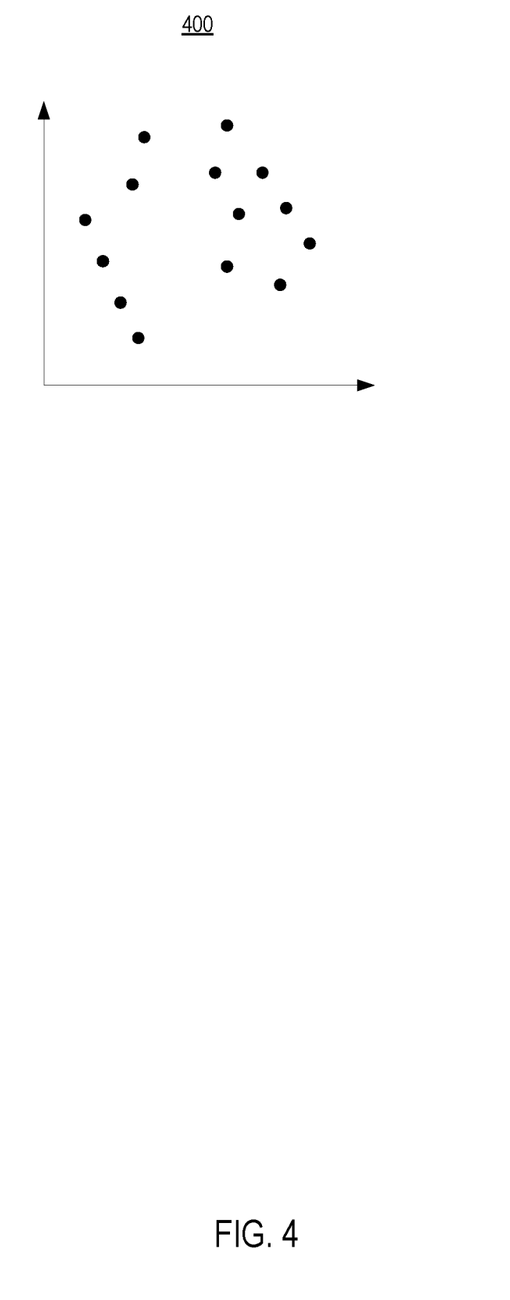
FIG. 4 shows an exemplary embedding space conversion for the knowledge graph shown in FIG. 3.

According to the KGE system 100, the structured data from the knowledge graph is received by a knowledge graph embedding circuitry 120. The knowledge graph embedding circuitry 120 is configured to convert the knowledge graph into an embedding space. FIG. 4 shows an exemplary embedding space 400 which includes vector nodes (e.g., vector set of triplets) representing the structured information included in the knowledge graph 300 shown in FIG. 3.

Figure 5:
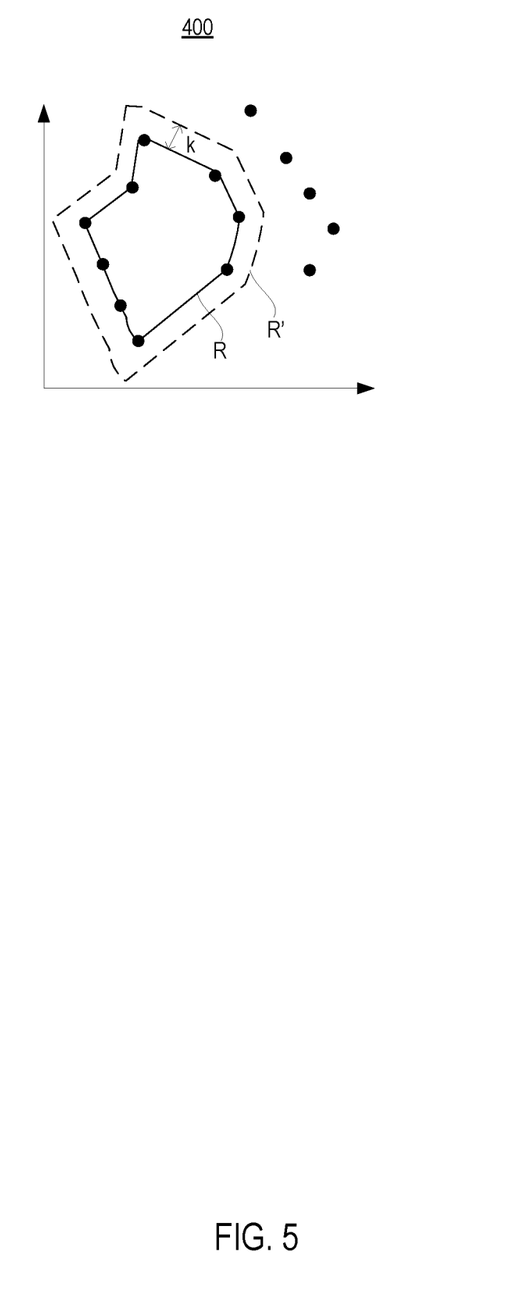
FIG. 5 shows a first region of interest within the exemplary embedding space shown in FIG. 4.

The KGE system 100 further includes a region identification circuitry 130 for selecting a region of interest within the embedding space. The selection may include selecting a concept-based first sub-set region within the embedding space that represents an area of interest, such as a region corresponding to specific categories of food (e.g., vegetarian recipes). FIG. 5 shows an exemplary first sub-set region R selected from the embedding space 400.

The region identification circuitry 130 may further determine a padding parameter that represents an extension distance extending out from the first sub-set region R by a predetermined padding distance k. The predetermined padding distance k may not extend past the region of interest and into another adjacent region. For example, FIG. 5 shows the first sub-set region R extended out a distance k (e.g., predetermined padding distance) to form a padded space that extends out from the first subset region R. The predetermined padding distance k is selected to be a small value, and to not extend into an adjacent region of interest (e.g., does not extend out to lactose-free recipes that are adjacent to the vegetarian recipes within the embedding space). When the padding distance k is applied, the region of interest is understood to extend out to include nodes that are also within the padding distance.

Figure 6:
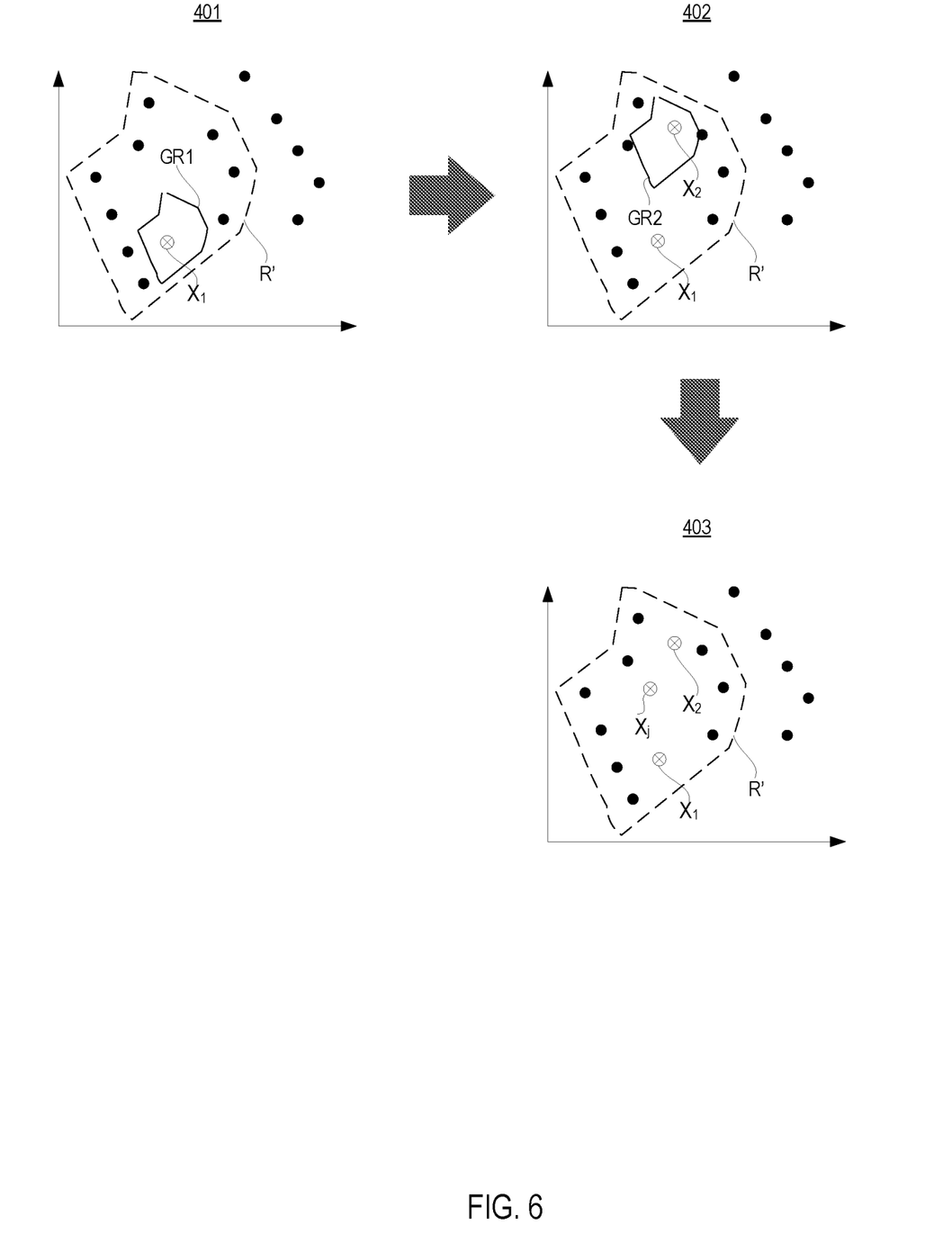
FIG. 6 shows a calculated center within multiple second regions of interest within the exemplary embedding space shown in FIG. 4.

The KGE system 100 further includes computation circuitry 140 for implementing computations within the embedding space. For example, the computation circuitry 140 may identify gap regions (e.g., a second sub-set region) within the region of interest, and compute Max-Min Multi-dimensional computations to determine a center for the gap regions within the region of interest. The computation circuitry 140 is further configured to consider that center node to be an embedding of a newly discovered recipe that was not present in the original knowledge graph. According to some embodiments, the center location may be weighted to include certain predetermined ingredients. This may be technically implemented by generating a new node within the embedding space at the determined center having the attributes of the newly discovered recipe. FIG. 6 illustrates an exemplary first graph 401, corresponding to the embedding space 400, where a first center $X_1$ for a first gap region GR1 is determined. FIG. 6 further illustrates an exemplary second graph 402, corresponding to the embedding space 400, where a second center $X_2$ for a second gap region GR2 is determined. FIG. 6 further illustrates an exemplary resulting graph 403, corresponding to the embedding space 400, where the resulting graph 403 includes locations for center nodes (e.g., $X_1$, $X_2$, and $X_j$) that are determined during the center determination processes described herein. As described below, each center X may correspond to the location of a new center node that will be generated for inclusion in to an updated knowledge graph.

The KGE system 100 further includes reconstruction circuitry 150 for reconstructing the structure (i.e., relationships) of the new node(s). This reconstruction circuitry 150 produces updates to the knowledge graph that contain the new node(s) added at the determined center of mass in the embedding space. The reconstruction process may be defined by the following calculation for each center node X that is determined:

Obtain all center locations $\{X_1, X_2, \text{ and } X_j\}$ within the embedding space.
For each $X \in \{X_1, X_2, \text{ and } X_j\}$;
  Get embedding of X
  Elaborate link probability between X and I (with I any ingredient concept in the original knowledge graph)
  Return top M ingredients I with highest link probability
Get $<I_i, \ldots, I_k>$ as the new recipe combination for the new recipe (i.e., new combination of ingredients) corresponding to the new center node at center location X.

Figure 7:
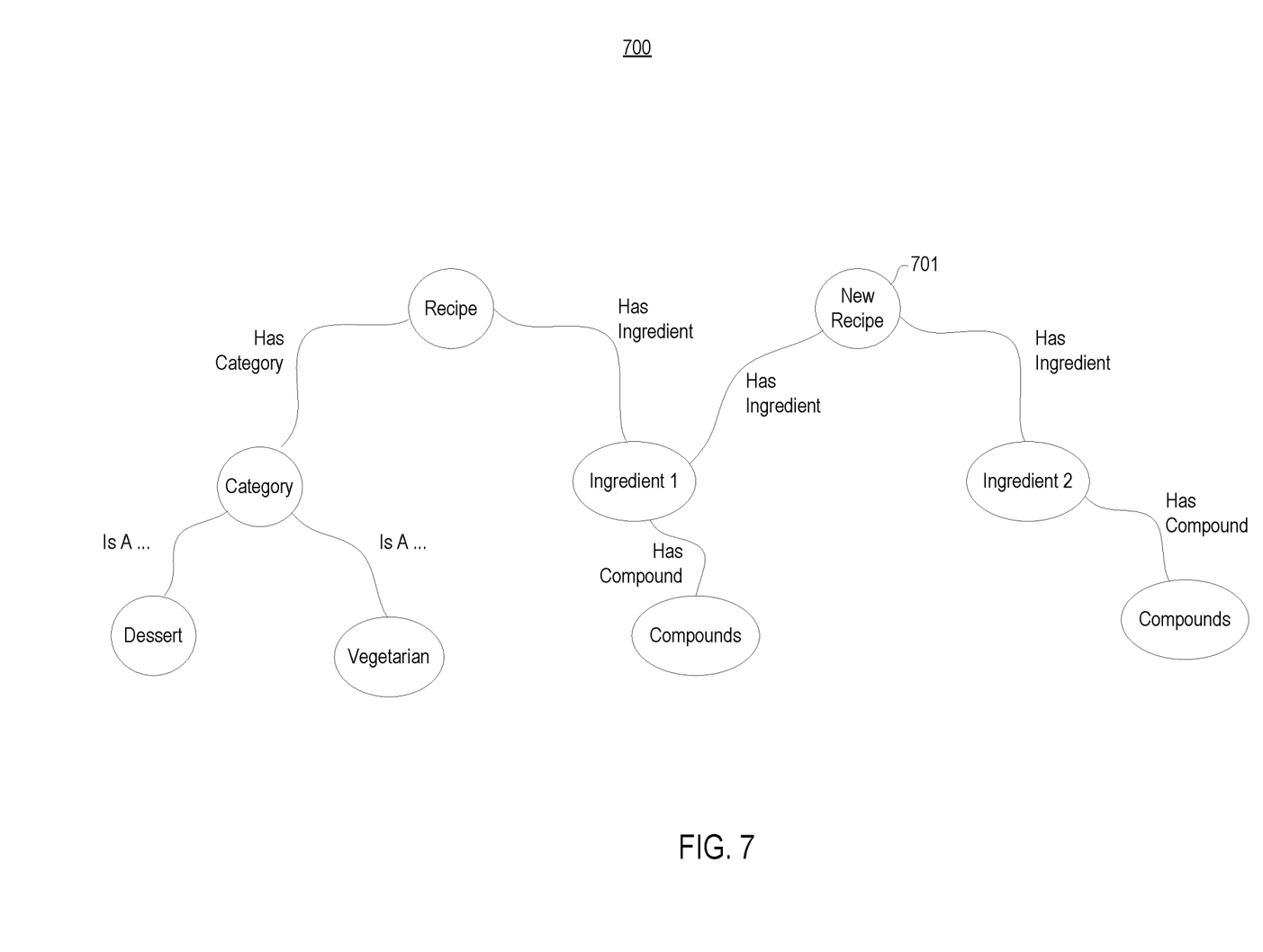
FIG. 7 shows an exemplary updated knowledge graph.

By adding the new node(s), the updated knowledge graph is enhanced with new nodes of information that depict new combinations of information previously not found in the original knowledge graph. FIG. 7 shows a new updated knowledge graph 700 that has been enhanced/updated with the new nodes of information from the original knowledge graph 300.

Figure 2:
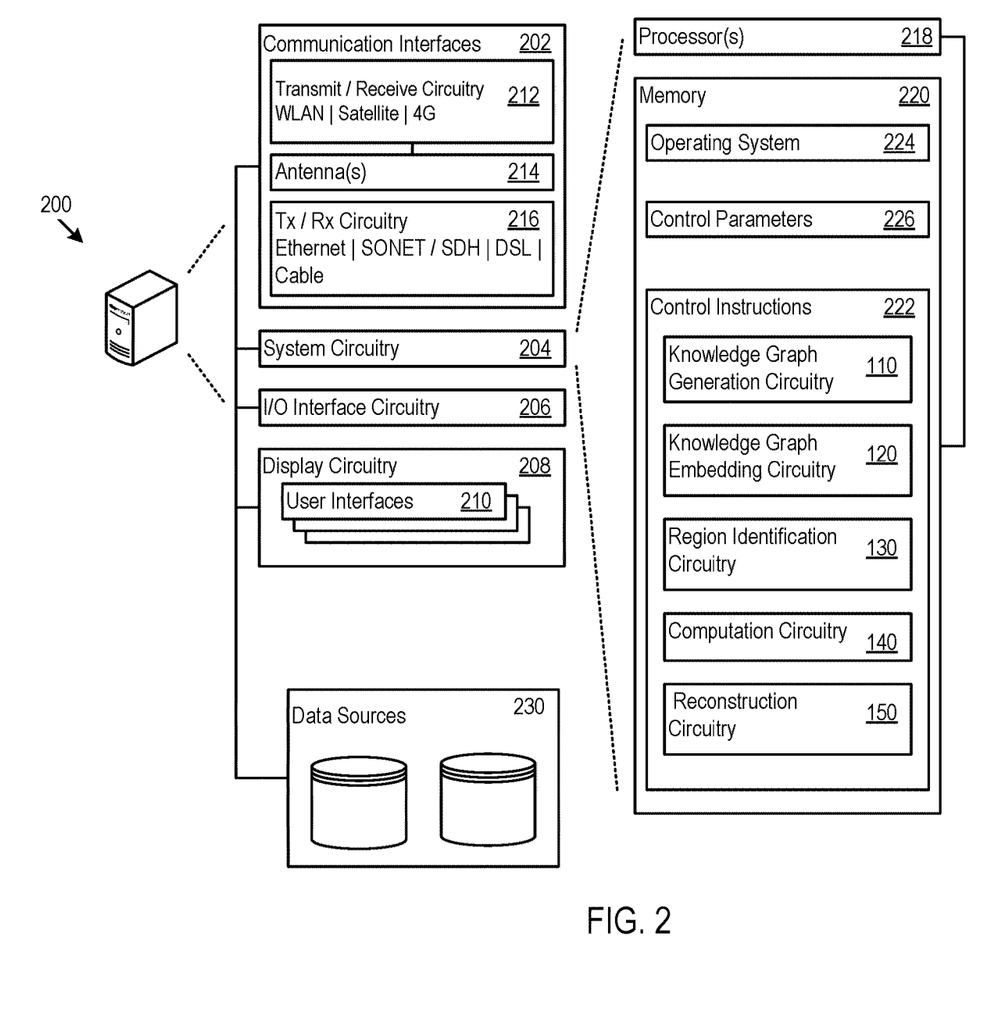
FIG. 2 shows an exemplary computer architecture for a computer device.

FIG. 2 illustrates an exemplary computer architecture of a computer device 200 on which the features of the KGE system 100 may be executed. The computer device 200 includes communication interfaces 202, system circuitry 204, input/output (I/O) interface circuitry 206, and display circuitry 208. The graphical user interfaces (GUIs) 210 displayed by the display circuitry 208 may be representative of GUIs generated by the KGE system 100 to present the query results to the enterprise application or end user having input the query. The GUIs 210 may be displayed locally using the display circuitry 208, or for remote visualization, e.g., as HTML, JavaScript, audio, and video output for a web browser running on a local or remote machine. Among other interface features, the GUIs 210 may further render displays of the constructed knowledge graphs.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 202 may also include serial interfaces, such as universal serial bus (USB), serial ATA, IEEE 1394, lighting port, $I^2C$, slimBus, or other serial interfaces. The communication interfaces 202 may also include wireline transceivers 216 to support wired communication protocols. The wireline transceivers 216 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality of the KGE system 100. As just one example, the system circuitry 204 may include one or more instruction processor 218 and memory 220.

The memory 220 stores, for example, control instructions 222 for executing the features of the KGE system 100, as well as an operating system 224. In one implementation, the processor 218 executes the control instructions 222 and the operating system 224 to carry out any desired functionality for the KGE system 100, including those attributed to the knowledge graph generation circuitry 110, the knowledge graph embedding circuitry 120, the region identification circuitry 130, the computation circuitry 140, or the reconstruction circuitry 150. The control parameters 226 provide and specify configuration and operating options for the control instructions 222, operating system 224, and other functionality of the computer device 200.

The computer device 200 may further include various data sources 230. Each of the databases that are included in the data sources 230 may be accessed by the KGE system to obtain data for consideration during any one or more of the processes described herein. For example, the knowledge graph generation circuitry 110 may access the data sources 230 to obtain the information for generating the knowledge graph 300.

Figure 8:
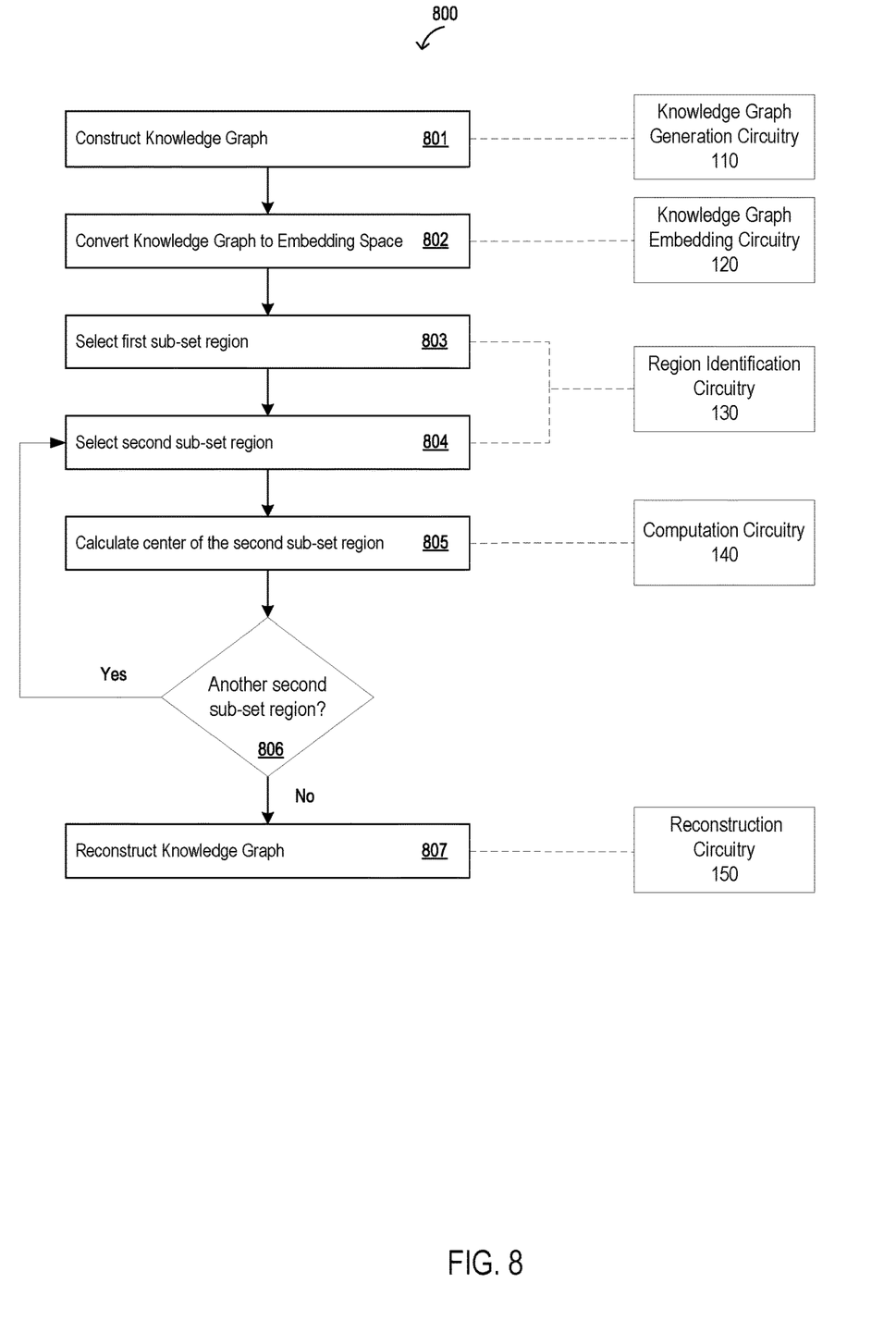
FIG. 8 shows a flow diagram for a process included in the knowledge graph enhancement process.

FIG. 8 shows a flow diagram 800 of logic representing processes implemented by the KGE system 100. The processes may be implemented by a computing device, system, and/or circuitry components as described.

The knowledge graph generation circuitry 110 constructs a knowledge graph based on received information (801). The knowledge graph includes nodes of information, and connecting edges representing a relationship between nodes at a head end of the edge and a tail end of the edge. FIG. 3 shows an exemplary knowledge graph 300 including structured data for a scope of known food recipes.

The knowledge graph embedding circuitry 120 receives the knowledge graph 300, and converts it into an embedding space (802). The conversion may include first converting the structured data from the knowledge graph 300 and converting them into a specific data format such as sets of vector triples. An exemplary vector triple may include the following format: <head entity, relationship, tail entity> (e.g., <tiramisu, has Category, dessert>. The vector triples conversion may be applied across the knowledge graph 300. The knowledge graph embedding circuitry 120 further implements the embedding space conversion by modeling the vector triples according to an elaboration of a neural network architecture to learn the representations of the knowledge graph 300. This way, the embedding space is constructed to be comprised of nodes (e.g., embedding vectors) representing the structured data comprising the knowledge graph 300, as shown by the embedding space 400 in FIG. 4. For example, each node in the embedding space 400 may correspond to a recipe included in the knowledge graph 300.

The region identification circuitry 130 selects a first sub-set region from within the embedding space (803). For example, the embedding space 400 may be comprised of one or more sub-set regions that correspond to areas including a specific type of recipe, such as chocolate-based recipes, vegetarian recipes, vegan recipes, or other categories of recipes. In FIG. 5, the first sub-set region R is said to correspond to recipes from the knowledge graph 300 belonging to a vegetarian recipes. This way, the region identification circuitry 130 implements a concept-based region identification in the knowledge graph embedding space to select the first sub-set region R. This first region selection process includes: 1) selecting nodes from the embedding space that are determined to belong to the region/concept of interest, 2) selecting supporting nodes that have a supporting relationship to the selected nodes that are determined to belong to the region/concept of interest, and 3) building a linear constraint for a region of interest R' that includes nodes from the first sub-set region R, as well as nodes that extend out a distance k (i.e., the predetermined padding parameter k), to define. According to this process, the region of interest R' is defined as an interconnection of a set of N linear constraints that are selected during this process:

$$w_j x + b_j < 0, j = 1, \ldots, N$$

By taking all those constraints together, they can be rewritten in a matrix form:

$$Ax \leq b$$

The region identification circuitry 130 selects a second sub-set region from within the region of interest R' (804). The second sub-set region is otherwise referred to as a gap region. The region of interest R' may include one or more gap regions where the region identification circuitry 130 determines there is a lack of information (i.e., nodes) in the embedding space. FIG. 6 shows an exemplary first gap region GR1 and an exemplary second gap region GR2, for the embedding space 400.

The region identification circuitry 130 calculates a center for each gap region (805). The center calculation is implemented according to an execution of a max/min problem solving calculation, where the center is determined to be the point at which the distance to the closest surrounding node is as large as possible (i.e., the node where the minimum distance to the closest nodes is maximized).

The center calculation is a process that is iteratively repeated to find many possible centers of different graphs. Each iteration consists of solving an optimization problem to identify a center point $X_J$ within the embedding space. In a first step to calculate a first center $X_1$ for a first gap region, the calculation may be represented as:

$$\min_i \|x - y_i\| \to \max_{x \in R},$$

$$Ax \leq b$$

As a second step to calculate a second center $X_2$ for a second gap region, the first center $X_1$ from the previous step is added to the embedding space. The calculation for determining the second center $X_2$ may be represented as:

$$\min_i \|x - y_i\| \max_{x \in R},$$

$$Ax \leq b$$

These calculations may be iterated for each gap region identified in the region of interest R' until gap centers $X_J$ corresponding to each of the recognized gap regions are determined (806). For example, the calculation for identifying centers of gap regions may be iterated while:

$$\min_i \|X_J - y_i\| > \text{threshold}$$

FIG. 6 shows an exemplary resulting graph 403 that includes center locations $(X_1, X_2, X_j)$ that are calculated for their respective gap region, according to this iterative process.

When all center locations $(X_1, X_2, \ldots, X_j)$ have been calculated, a node is created for each of the center locations, where each of the new center nodes include information describing a new recipe composed of ingredients found from recipes from the original knowledge graph. It follows that the reconstruction procedure also finds relationships (i.e., links) between the new recipes and existing ingredients from the original knowledge graph. An updated knowledge graph 700 is constructed from the original knowledge graph 300, where the updated knowledge graph 700 includes the new recipes created to represent all the calculated centers $X_j$ of the recognized gap regions. For example, the updated knowledge graph 700 includes the new recipe 701 which was not present in knowledge graph 300. The new recipe 701 includes a new combination of ingredients, where the ingredients themselves were existing ingredients from recipes included in the original knowledge graph.

Various implementations have been specifically described. However, other implementations that include a fewer, or greater, number of features and/or components for each of the apparatuses, methods, or other embodiments described herein are also possible.

What is claimed is:

1. A system comprising:
   a hardware memory for storing instructions; and
   a hardware processor in communication with the hardware memory and configured to execute the instructions to:
      receive an original knowledge graph including a set of structured data;
      convert the set of structured data of the original knowledge graph to nodes in an embedding space;
      determine a region of interest within the embedding space representing a region of a common concept in the embedding space;
      determine a gap region within the region of interest, the gap region lacking corresponding structured data in the original knowledge graph;
      determine a location of a center of the gap region within the region of interest in the embedding space based on locations of nodes corresponding to structured data in the original knowledge graph within the region of interest but outside of the gap region in the embedding space;
      create a center node at the location of the center of the gap region in the embedding space, the center node incorporating ingredients found from surrounding existing nodes in the embedding space and the original knowledge graph;
      create a new structured data corresponding to the center node, the new structured data including the ingredients found from the original knowledge graph corresponding to the surrounding existing nodes of the center node in the embedding space; and
      reconstruct relationships associated with the center node in the embedding space by finding links of the center node in the embedding space with existing nodes in the embedding space and updating the original knowledge graph by adding the new structured data generated corresponding to the center node and links in the embedding space.

2. The system of claim 1, wherein, to determine the location of the center of the gap region within the region of interest, the hardware processor is configured to execute the instructions to:
   determine the center for the gap region as a point at which a distance from the point to a closest surrounding node is as large as possible from amongst the surrounding existing nodes.

3. The system of claim 1, wherein, to determine the location of the center of the gap region within the region of interest, the hardware processor is configured to execute the instructions to:
   solve a min-max optimization problem to identify a location which maximizes the minimum distance between nodes.

4. The system of claim 1, wherein, to determine the location of the center of the gap region within the region of interest, the hardware processor is configured to execute the instructions to iterate steps of:
   determining a possible location in the gap region; and determining a minimum distance between the possible location and each node surrounding the gap region, to identify a location which maximizes the minimum distance as the location of the center of the gap region.

5. The system of claim 1, wherein the hardware processor is further configured to execute the instructions to determine a plurality of gap regions and determine at least one center for each of the plurality of gap regions.

6. The system of claim 1, wherein the hardware processor is further configured to execute the instructions to:
receive a padding distance; and
extend the region of interest further out by the padding distance without being extended into another adjacent region of interest.

7. The system of claim 1, wherein the hardware processor is further configured to execute the instructions to:
receive a user request query; and
determine the region of interest within the embedding space based on the user request query.

8. A method comprising:
receiving, by a knowledge graph reception circuitry, an original knowledge graph including a set of structured data;
converting, by a knowledge graph embedding circuitry, the set of structured data of the original knowledge graph to nodes in an embedding space;
determining, by a region identification circuitry, a region of interest within the embedding space representing a region of a common concept in the embedding space;
determining, by the region identification circuitry, a gap region within the region of interest, the gap region lacking corresponding structured data in the original knowledge graph;
determining, by a computation circuitry, a location of a center of the gap region within the region of interest in the embedding space based on locations of nodes corresponding to structured data in the original knowledge graph within the region of interest but outside of the gap region in the embedding space;
creating a center node at the location of the center of the gap region in the embedding space, the center node incorporating ingredients found from surrounding existing nodes in the embedding space and the original knowledge graph;
creating a new structured data corresponding to the center node, the new structured data including the ingredients found from the original knowledge graph corresponding to the surrounding existing nodes of the center node in the embedding space;
discovering relationships between the center node and other nodes in the embedding space; and
enhancing, by a reconstruction circuitry, the original knowledge graph into an updated knowledge graph by adding the new structured data corresponding to the center node and the relationships.

9. The method of claim 8, wherein determining the center for the gap region comprises determining the center as a point at which a distance from the point to a closest surrounding node is as large as possible from amongst the surrounding existing nodes.

10. The method of claim 8, wherein determining the location of the center of the gap region comprises:
solving a min-max optimization problem to identify a location which maximizes the minimum distance between nodes.

11. The method of claim 8, wherein determining the location of the center of the gap region comprises iterating steps of:
determining a possible location in the gap region; and
determining a minimum distance between the possible location and each node surrounding the gap region, to identify a location which maximizes the minimum distance as the location of the center of the gap region.

12. The method of claim 8, comprising determining a plurality of gap regions, and determining at least one center for each of the plurality of gap regions.

13. The method of claim 8, further comprising:
receiving, by a data padding circuitry, a padding distance; and
extending, by the data padding circuitry, the region of interest further out by the padding distance without being extended into another adjacent region of interest.

14. The method of claim 8, further comprising:
receiving, by the region identification circuitry, a user request query; and
determining, by the region identification circuitry, the region of interest within the embedding space based on the user request query.

15. A product comprising:
a machine-readable medium, other than a transitory signal; and
instructions stored on the machine-readable medium, the instructions configured to, when executed, cause processing circuitry to:
receive an original knowledge graph including a set of structured data;
convert the set of structured data of the original knowledge graph to nodes in an embedding space;
determine a region of interest within the embedding space representing a region of a common concept in the embedding space;
determine a gap region within the region of interest, the gap region lacking corresponding structured data in the original knowledge graph;
determine a location of a center of the gap region within the region of interest in the embedding space based on locations of nodes corresponding to structured data in the original knowledge graph within the region of interest but outside of the gap region in the embedding space;
create a center node at the location of the center of the gap region in the embedding space, the center node incorporating ingredients found from surrounding existing nodes in the embedding space and the original knowledge graph;
create a new structured data corresponding to the center node, the new structured data including the ingredients found from the original knowledge graph corresponding to the surrounding existing nodes of the center node in the embedding space;
discover relationships between the center node and other nodes in the embedding space; and
reconstruct the center node by finding links with existing nodes from the original knowledge graph and updating the original knowledge graph by adding the new structured data corresponding to the center node and links in the embedding space.

16. The product of claim 15, wherein the instructions, when executed, cause the processing circuitry to:

determine the center for the gap region as a point at which a distance from the point to a closest surrounding node is as large as possible from amongst the surrounding existing nodes.

17. The product of claim 15, wherein the instructions, when executed, cause the processing circuitry to determine the location of the center of the gap region by:

solving a min-max optimization problem to identify a location which maximizes the minimum distance between nodes.

18. The product of claim 15, wherein the instructions, when executed, cause the processing circuitry to determine the location of the center of the gap region by iterating the steps of:

determining a possible location in the gap region; and determining a minimum distance between the possible location and each node surrounding the gap region, in an iterative manner to identify a location which maximizes the minimum distance.

\* \* \* \* \*